(12) United States Patent
Xu et al.

(10) Patent No.: US 7,398,388 B2
(45) Date of Patent: Jul. 8, 2008

(54) INCREASING PEER PRIVACY

(75) Inventors: Zhichen Xu, Sunnyvale, CA (US); Li Xiao, Williamsburg, VA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1475 days.

(21) Appl. No.: 10/084,436

(22) Filed: Feb. 28, 2002

(65) Prior Publication Data
US 2003/0163689 A1     Aug. 28, 2003

(51) Int. Cl.
*H04L 9/00* (2006.01)

(52) U.S. Cl. .................. 713/163; 713/153; 713/171; 709/239; 726/26; 380/30; 380/278

(58) Field of Classification Search .............. 713/163, 713/153; 709/239; 726/26, 162
See application file for complete search history.

(56) References Cited

U.S. PATENT DOCUMENTS

| | | | | |
|---|---|---|---|---|
| 5,862,223 A | * | 1/1999 | Walker et al. | 705/50 |
| 6,460,036 B1 | * | 10/2002 | Herz | 707/10 |
| 2002/0128871 A1 | * | 9/2002 | Adamson et al. | 705/3 |

* cited by examiner

*Primary Examiner*—Gilberto Barrón, Jr.
*Assistant Examiner*—Samson Lemma

(57) ABSTRACT

In a method for increasing peer privacy, a request for a data is received from a data requester and the data is stored at a data provider. A plurality of peers are selected to form a path, where the data provider and the data requestor are the respective ends of the path. A mix is generated according to the path and the mix is transmitted to the data provider.

36 Claims, 8 Drawing Sheets

INCREASING PEER PRIVACY

FIELD OF THE INVENTION

This invention relates generally to network systems. More particularly, the invention relates to increasing privacy in a network system.

DESCRIPTION OF THE RELATED ART

A conventional system of network nodes (or peers) interconnected via a network provides a relatively convenient means of exchanging information between the peers. However, the conventional network system may be vulnerable to malicious users. For example, by monitoring the network traffic on the network, malicious users may determine the types of information stored at specific peers. This may be problematic if one of the peers is a source of sensitive information.

Most existing anonymity techniques are for client/server models, which hide the identities of the requester (clients) from the servers. Some research addresses the problem of enforcing the mutual anonymity between a requestor and responder in a peer-to-peer ('P2P') environment. One technique to substantially ensure privacy in a conventional network system is to configure each peer to only keep the addresses of limited number of other network nodes. Accordingly, the identity of each peer is hidden from the other network nodes. However, this technique may suffer from some drawbacks or disadvantages. For instance, a peer may have to blindly broadcast its anonymous request for information to a large number of the peers. As a result, each peer receiving the request may search for the requested information. A majority of the peers may not have the requested information but are still required to process the request, and, thereby, waste computational time.

Another technique to substantially ensure privacy in a conventional network system is to use a trusted third party to hide the identity of the peer. However, this approach also has its drawbacks and disadvantages. For example, since the requests for information are funneled through the trusted third party, the trusted third party may become a bottleneck for network traffic. As a result, the overall performance of the conventional network system may be substantially reduced.

SUMMARY OF THE INVENTION

An embodiment of the present invention pertains to a method of increasing peer privacy. The method includes receiving a request for data from a data requester, where the data is stored at a data provider and selecting a plurality of peers to form a path. The data provider and the data requester are the respective ends of the path. The method also includes generating a mix according to the path and transmitting the mix to the data provider.

Another embodiment of the present invention relates to a method of increasing peer privacy. The method includes receiving a message that includes a mix at a current peer and modifying the mix by applying a complementary encryption key of the current peer to the mix. The method also includes retrieving a subsequent peer to the current peer and modifying the message with the modified mix. The method further includes transmitting the modified message to the subsequent peer.

Yet another embodiment of the present invention pertains to a system for increasing privacy. The system includes at least one processor, a memory coupled to the at least one processor and a privacy module residing in the memory and the privacy module executed by the at least one processor. The privacy module is configured to receive a request for a data from a data requestor, where the data is stored at a data provider and to select a plurality of peers to form a path. The data provider and the data requestor are the respective ends of the path. The privacy module is also configured to generate a mix according to the path and transmit the mix to the data provider.

Yet another embodiment of the present invention relates to an apparatus for increasing privacy in a data requestor. The apparatus includes at least one processor, a memory coupled to at least one processor, and a privacy module residing in the memory and the privacy module executed by the at least one processor. The privacy module is configured to receive a message at the data provider, where message includes a mix configured to provide a path among a plurality of peers, an encrypted reference to requested data encrypted with a first encryption key, and an encrypted first encryption key protected with a public key of the data requester. The privacy module is also configured to decrypt the first encryption key with a complementary encryption key to the public key of the data provider and to decrypt the data reference with the first encryption key.

Yet another embodiment of the present invention pertains to a computer readable storage medium on which is embedded one or more computer programs. The one or more computer programs implement a method of increasing peer privacy. The one or more computer programs includes a set of instructions for receiving a request for a data from a data requester, wherein the data is stored at a data provider and selecting a plurality of peers to form a path, where the data provider and the data requester are the respective ends of the path. The set of instructions also include generating a mix according to the path and transmitting the mix to the data provider.

BRIEF DESCRIPTION OF THE DRAWINGS

Various features of the present invention can be more fully appreciated as the same become better understood with reference to the following detailed description of the present invention when considered in connection with the accompanying figures, in which.

DETAILED DESCRIPTION OF A PREFERRED EMBODIMENT

Figure 1:
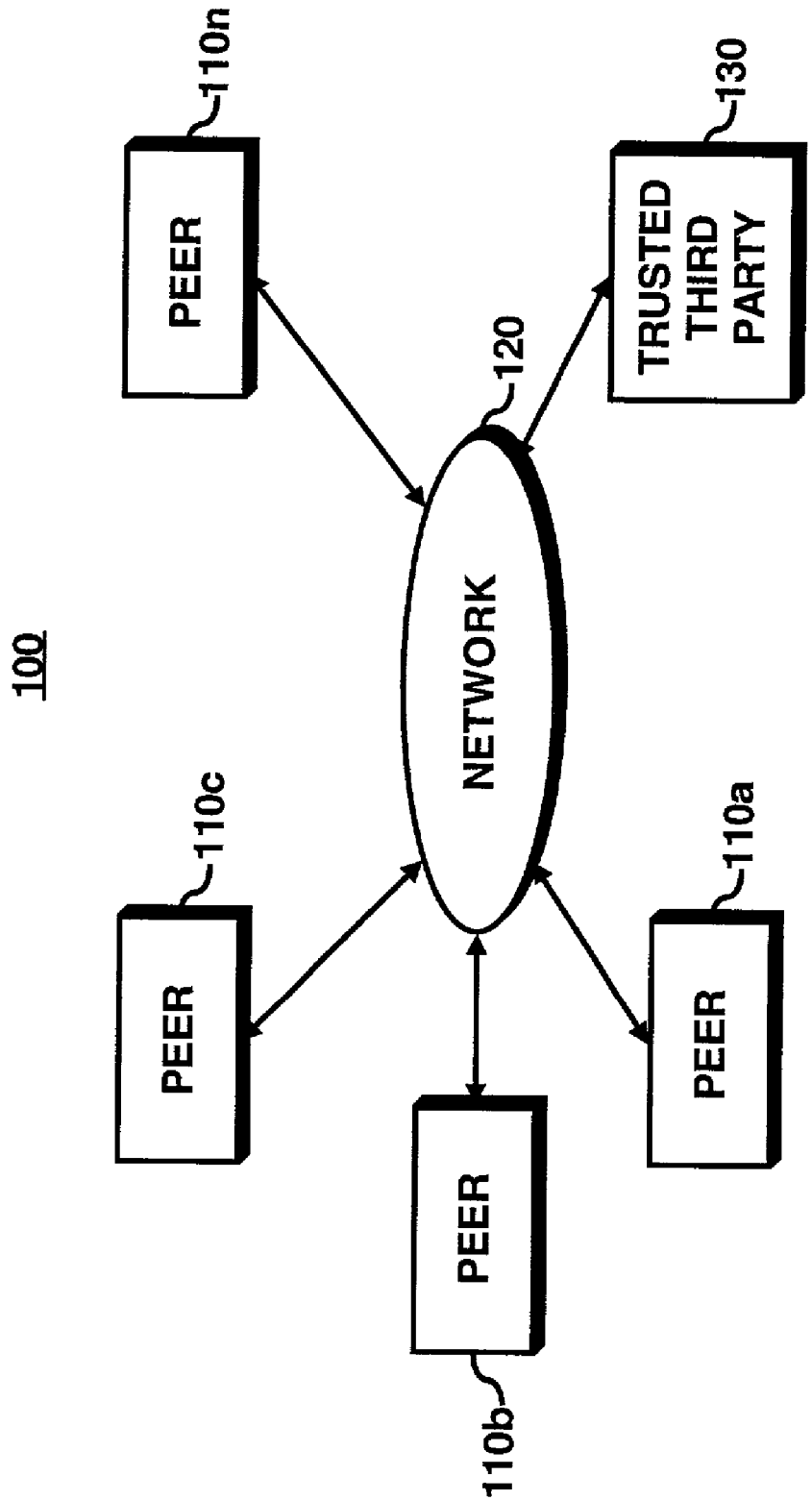
FIG. 1 illustrates an exemplary system where an embodiment of the invention may be practiced.

For simplicity and illustrative purposes, the principles of the present invention are described by referring mainly to an exemplary embodiment thereof. However, one of ordinary skill in the art would readily recognize that the same principles are equally applicable to, and can be implemented in, all types of network systems, and that any such variations do not depart from the true spirit and scope of the present invention. Moreover, in the following detailed description, references are made to the accompanying figures, which illustrate specific embodiments in which the present invention may be practiced. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

In accordance with an embodiment of the present invention, a peer privacy module is utilized to increase peer privacy in a data network system. The data network system may include a number of peers interconnected by a network, each peer being configured to utilize a peer privacy module. The data network system may include a trusted-third-party also configured to utilize the peer privacy module, which is configured to protect the identities of a data requester peer and a data provider peer. The peer privacy module on the trusted-third-party may be configured to select an anonymizing path for any information (data, files, etc.) to be transferred from the data provider peer to the data requester peer. More specifically, when a request for information is received by the trusted-third-party and verified that the information exists in the data network system, the trusted-third-party may be configured to select a list of peers at random with the data provider peer and data requestor peer as the respective ends of the list, i.e., a path.

The trusted-third-party may build then an anonymizing path (or mix) with the data provider peer according to the order of the peers on the list. The mix may be formed by recursively generating an encrypted tuple (or encrypted segment). More specifically, the trusted-third-party generates a tuple that comprises a fake (or decoy) mix and the identity of the data requester peer. The tuple is encrypted with the public key of the peer next to the data requestor peer according the list of peers, i.e., the path, to form a current state of the mix (or encrypted segment). The rest of the path is added to the mix by encrypting tuples of a current peer along the path and a current state of the mix with the public key of the peer subsequent to the current peer to form the next state of the mix until the data provider peer is reached on the path.

The trusted-third-party may then create an encryption key, where the generated encryption key may be used to encrypt a reference to the requested data. The encryption key is encrypted with a public key of the data requester peer and is also encrypted with the public key of the data provider peer. The encrypted data reference, the current state of the mix, the encryption key encrypted by the public key of the data provider peer, and the encryption key encrypted by the public key of the data requestor peer may be transmitted in a message to the data provider peer.

In another embodiment of the present invention, the peer privacy module executing on a data provider peer may be configured to receive a message from the trusted-third-party. The message may include encrypted data reference, the current state of the mix, the encryption key encrypted by the public key of the data provider peer, and the encryption key encrypted by the public key of the data requester peer. The peer privacy module may use its complementary key to decrypt the encryption key encrypted with the public key of the data provider peer and to the current state of the mix to obtain the identity of the next peer and a previous state of the mix. The decrypted encryption key is then applied to the encrypted reference.

The peer privacy module may also be configured to retrieve the information associated with the decrypted reference and encrypt the information with the decrypted encryption key. Subsequently, the peer privacy module may be further configured to format a message with the encryption key encrypted with the public key of the data requestor key, the encrypted information and the previous state of the mix and the message may be transmitted to the identified next peer.

In yet another embodiment of the present invention, the peer privacy module at a data requestor peer may be configured to receive a message from another peer. The message may include the encrypted information, the encryption key encrypted with the public key of the data requestor peer, and the current state of the mix. The peer privacy module may be configured to apply a complementary key of the data requestor peer to the current state of the mix to obtain the identity of the next peer along the path and the previous state of the mix. If the identified next peer is unknown to the peer, the peer privacy module may be configured to retrieve the encrypted encryption key from the message and apply a complementary encryption key to decrypt the encryption key. The peer privacy module may apply the decrypted encryption key to decrypt the requested information. Otherwise, if the identity of the next peer is known, the peer privacy module may reformat the message with the previous state of the mix and forward the reformatted message to the identified next peer.

Accordingly, a peer privacy module may be utilized to protect the identities of a requestor and provider of data. Moreover, the peer privacy module may increase the data network system efficiency by setting up a persistent connection using an Onion routing technique. The cost of connection setup will be amortized when the connection is used by multiple messages.

FIG. 1 illustrates an exemplary block diagram of a system 100 where an embodiment of the present invention may be practiced. It should be readily apparent to those of ordinary skill in the art that the system 100 depicted in FIG. 1 represents a generalized schematic illustration and that other components may be added or existing components may be removed or modified without departing from the spirit or scope of the present invention.

As shown in FIG. 1, the system 100 includes a plurality of peers 110a . . . 110n. The peers 110a . . . 110n may be configured to exchange information among themselves and with other network nodes over a network 120. The peers 110a . . . 110n may also be configured to determine which peers 110a . . . 110n are valid. The peers 110a . . . 110n may be computing platforms (e.g., personal digital assistants, laptop computers, workstations, and other similar devices) that have a network interface. The peers 110a . . . 110n may be further configured to execute an application software program that provides the capability to share information (e.g., files, data, applications, etc.) in a peer-to-peer manner. An example of a peer-to-peer software application is KAZAA, NAPSTER, MORPHEUS, or other similar P2P applications.

The network 120 may be configured to provide a communication channel among the peers 110a . . . 110n. The network 120 may be implemented as a local area network, wide area network or combination thereof. The network 120 may implement wired protocols such as Ethernet, token ring, etc., wireless protocols such as Cellular Digital Packet Data, Mobitex, IEEE 801.11b, Wireless Application Protocol, Global System for Mobiles, etc., or combination thereof.

The system 100 may include a trusted-third-party 130. The trusted-third-party 130 may be implemented as a computing platform similar to the peers 110a . . . 110n. The trusted-thirdparty 130 may be configured to be trustworthy, i.e., not to modify or change information routed therethrough.

According to an embodiment of the present invention, a user of the peer 110a, as a data requester, may request information (e.g., a file) from the peer 110n, as a data provider. The user of peer (e.g., 110a) may send a request for the selected information to the trusted-third-party 130, which may be configured to determine if the selected information exists on the peer 110n. If the information exists, the trusted-third-party 130 may be configured to select a plurality of peers and to form an anonymizing path (or mix). The mix may be configured to provide an encrypted anonymous path from the peer 110n through the selected peers to peer 110a. The mix may include a fake or decoy mix to provide increased level of anonymity. Moreover, the mix may include encrypted segments of the path between the selected peers as another measure of anonymity.

The trusted-third-party 130 may also be configured to generate an encryption key utilizing an encryption algorithm such as DES, El Gamal, etc. The trusted-third-party 130 may be further configured to form a message that comprises the encryption key encrypted with a public key of peer 110n, the encryption key encrypted with a public key of peer 110a, a reference to the requested information encrypted with the generated encryption key, and the mix. The trusted-third-party 130 may be further configured to transmit this message to the peer 110n functioning as the data provider.

When the message is received at peer 110n, the peer 110n may be configured to apply a complementary key to the encryption key encrypted with the public key of the peer 110n. The decrypted encryption key may be applied to the encrypted reference to the requested information embedded in the message. The peer 110n may retrieve the information and encrypt the retrieved information with the decrypted encryption key. The peer 110n may apply its complementary key to the current state of the mix from the received message to obtain the identity of the next peer among the selected plurality of peers and a previous state of the mix. The peer 110n may be further configured to form a message comprising of the encrypted information, the previous state of the mix, and the encryption key encrypted with the public key of the data requester peer to be transmitted to the identified next peer, for example, peer 110a.

According to another embodiment, the present invention is related to a current peer receiving a message from a previous peer. The message may include encrypted information, the encryption key encrypted with the public key of the data requester peer, e.g., peer 110a, and the current state of the mix. The current peer may be configured to apply its complementary (or private) key to the current state of the mix to retrieve the identity of the subsequent peer and to derive a previous state of the mix. If the identified next peer is valid peer, the current peer may be further configured to modify the received message with the previous state of the mix and forward the modified message to the subsequent peer.

Otherwise, if the peer is invalid, the peer 110a may be configured to apply a complementary encryption key to the encryption key encrypted with the public key of data requestor peer, e.g., peer 110a, to obtain a decrypted encryption key. The peer 110a may then apply the decrypted encryption key to encrypted data from the message to retrieve the requested information. Accordingly, by utilizing an embodiment of the present invention, the identity of a data requestor and a data provider are afforded a level of protection during a data transfer. Moreover, the trusted-third-party may avoid becoming a throughput bottleneck for the overall system because the trusted-third-party directs data to be transferred between parties.

Figure 2:
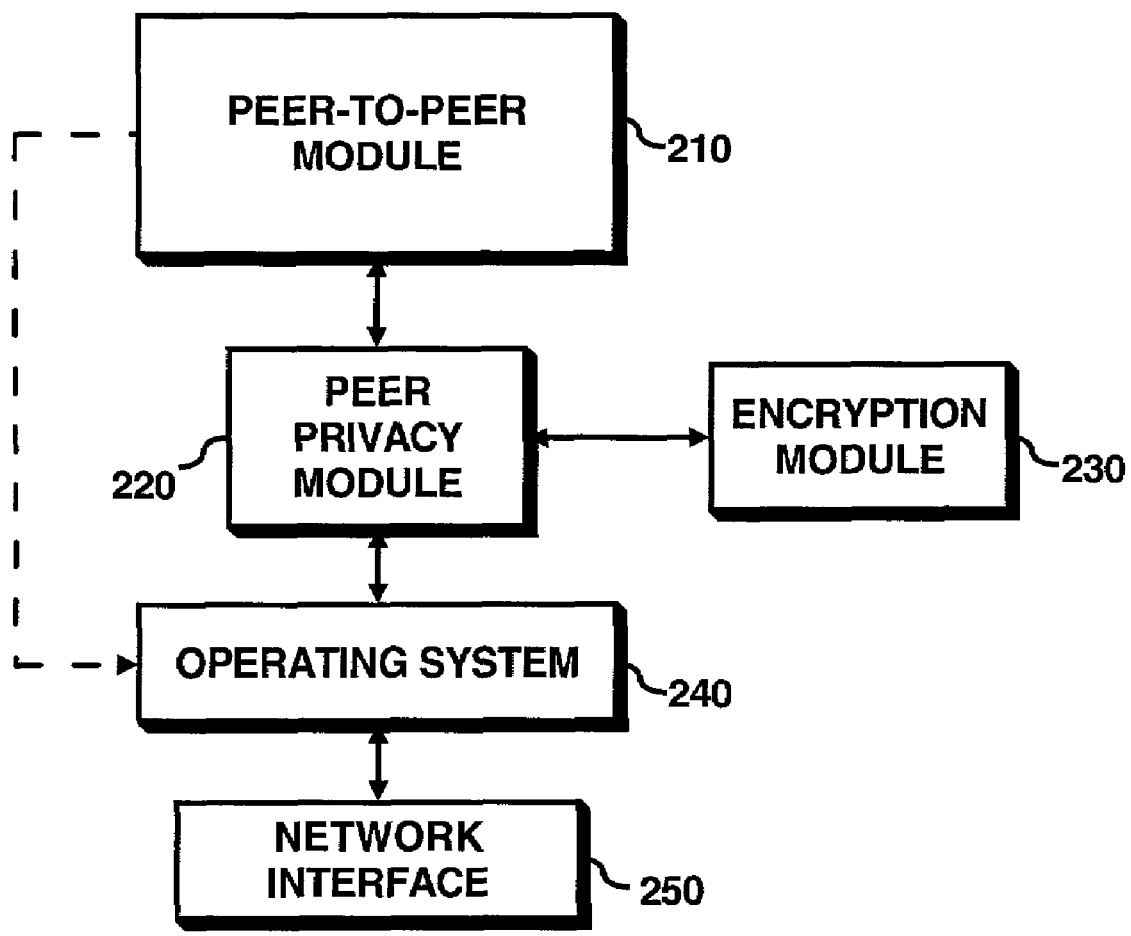
FIG. 2 illustrates an exemplary architecture for a peer in the system shown in FIG. 1.

FIG. 2 illustrates an exemplary architecture 200 for a peer in the system 100 shown in FIG. 1 in accordance with an embodiment of the present invention. It should be readily apparent to those of ordinary skill in the art that the architecture 200 depicted in FIG. 2 represents a generalized schematic illustration and that other components may be added or existing components may be removed or modified without departing from the spirit or scope of the present invention. Moreover, the architecture 200 may be implemented using software components, hardware components, or a combination thereof.

As shown in FIG. 2, the architecture 200 may include a peer-to-peer module 210, a peer privacy module 220, an encryption module 230, an operating system 240 and a network interface 250.

The peer-to-peer module 210 may be configured to provide the capability to a user of a peer to share information with another peer, i.e., each peer may initiate a communication session with another peer. The peer-to-peer module 210 may also be configured to determine which peers are valid. The validity information of the other peers in the system 100 may be made available to the peer privacy module 220.

The peer-to-peer module 210 may be a commercial off-the-shelf application program, a customized software application or other similar computer program. Such programs such as KAZAA, NAPSTER, MORPHEUS, or other similar P2P applications may implement the peer-to-peer module 210. Alternatively, the peer-to-peer module 210 may be configured to directly interface with the operating system 240.

The peer privacy module 220 may be configured to monitor an interface between the peer-to-peer module 210 and the operating system 240. The peer privacy module 220 may also be configured to substantially protect the identity of the peer when the peer requests information from another peer by utilizing the peer-to-peer module 210. More specifically, the peer privacy module 220 may send a message to a trusted-third-party such as the trusted-third-party 130 shown in FIG. 1. If the trusted-third-party determines that the information is available in a peer, the trusted-third-party may forward the request to the selected peer.

In another respect, the peer privacy module 220 may be configured to receive a message from a trusted-third-party, such as trusted-third-party 130. The message may include an encryption key encrypted with the public key of the data provider peer, an encrypted reference, the same encryption key encrypted with the public key of the data requestor peer, and a current state of the mix.

The peer privacy module 220 may apply its complementary encryption key to the encryption key encrypted with the public key of the data provider peer embedded in the received message. The decrypted encryption key may then be applied to the encrypted reference. The peer privacy module 220 may then retrieve the requested information. The peer privacy module 220 may also apply its complementary encryption key to the current state of the mix to identify the next peer and to obtain a previous state of the mix. Subsequently, the peer privacy module 220 formats a new message with the encrypted information, the encryption key encrypted with the public key of the data requestor peer, and the previous state of the mix. The peer privacy module 220 transmits the message to the identified next peer.

In yet another respect, the peer privacy module 220 may be configured to process messages from other peers such as peers 110a . . . 110n. A peer may receive a message that comprises encrypted information, an encryption key encrypted with a public key of the data requester, and a current state of the mix. The peer privacy module 220 may be configured to apply its complementary key to the mix to retrieve the identity of the subsequent peer and the next state of the mix. The peer privacy module 220 may also be configured to determine if the subsequent peer is a valid peer. If the peer is valid, the peer privacy module 220 may be further configured to modify the message with the previous state of the mix and forward the modified message to the subsequent peer.

Otherwise, if the peer is invalid, the peer privacy module 220 may be configured to decrypt the encryption key with a complementary key of the receiving peer. The peer privacy module 220 may also be configured to apply the decrypted encryption key to the encrypted information contained in the received message to obtain the requested information. Accordingly, the receiving peer may receive requested data without knowing the identity of the data providing peer, thus substantially ensuring privacy among the peers.

The peer privacy module 220 may be implemented as a software program, a utility, a subroutine, or other similar programming entity. In this respect, the peer privacy module 220 may be implemented using software languages such as C, C++, JAVA, etc. Alternatively, the peer privacy module 220 may be implemented as an electronic device utilizing an application specific integrated circuit, discrete components, solid-state components or combination thereof.

The peer privacy module 220 may be further configured to interface with an encryption module 230. The encryption module 230 may be configured to provide encryption and decryption services to the peer privacy module 220. For example, the encryption module 230 may generate encryption keys, decrypt encrypted information, etc. The encryption module 230 may use asymmetric or symmetric encryption algorithms. Each peer privacy module 220 may have an encryption key pair, a public and private (or complementary) key. The public key is distributed to the other peers including the trusted-third-party 130. When the other peers and/or trusted-third-party 130 require a secure means of transferring information to the peer privacy module 220, they may encrypt the information with the public key. The peer privacy module 220 may use the private key to decrypt the encrypted information, thus substantially ensuring security for information exchanges.

The peer privacy module 220 may be further configured to interface with the operating system 240. More specifically, the peer privacy module 220 may be interfaced with the operating system 240 through an application program interface (API, not shown). The operating system 240 may be configured to manage the software applications, data and respective hardware components (e.g., displays, disk drives, etc.) of a peer. The operating system 240 may be implemented by the MICROSOFT WINDOWS family of operating systems, UNIX, HEWLETT-PACKARD HP-UX, LINUX, RIM OS, and other similar operating systems. Alternatively, the peer-to-peer module 210 may be directly interfaced with the operating system 240 where the privacy module 220 monitoring the API.

The operating system 240 may be further configured to be coupled with the network interface 250 through a device driver (not shown). The network interface 250 may be configured to provide a communication port for the respective peer over the network 120 (shown in FIG. 1). The network interface 250 may be implemented using a network interface card, a wireless interface card or other similar input/output device.

Figure 3:
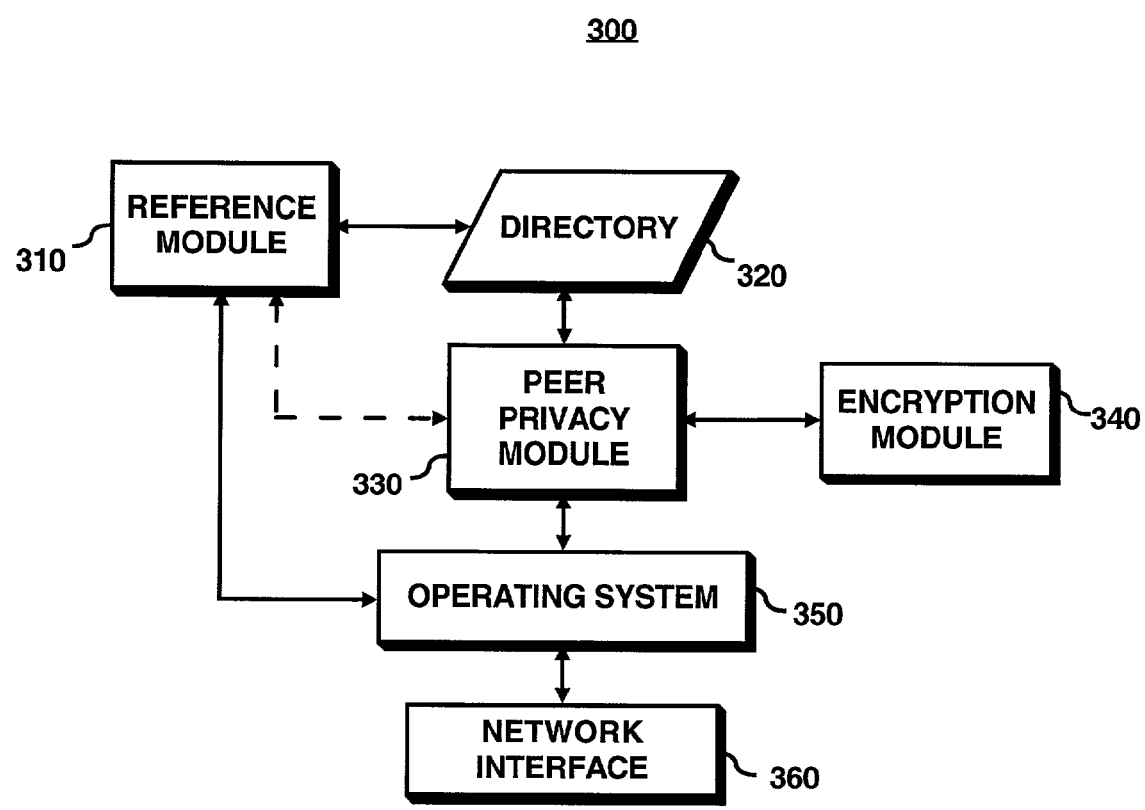
FIG. 3 illustrates an exemplary architecture for a trusted-third-party in the system shown in FIG. 1.

FIG. 3 illustrates an exemplary architecture 300 for the trusted-third-party 130 shown in FIG. 1 in accordance with an embodiment of the present invention. It should be readily apparent to those of ordinary skill in the art that the architecture 300 depicted in FIG. 3 represents a generalized schematic illustration and that other components may be added or existing components may be removed or modified without departing from the spirit or scope of the present invention. Moreover, the architecture 300 may be implemented using software components, hardware components, or a combination thereof.

As shown in FIG. 3, the architecture 300 may include a reference module 310, a directory 320, a peer privacy module 330, an encryption module 340, an operating system 350, and a network interface 360. The reference module 310 may be configured to provide reference services for peers 110$a$ . . . 110$n$ in the network 120 through the operating system 350. The reference module 310 may periodically determine the types of information located within each peer of the data network system 100. The reference module 310 may also determine a location and/or existence of information (e.g., data, a file, etc.) in response to a request for information from a peer in the network 120.

The reference module 310 may be coupled to the directory 320. The directory 320 may be configured to provide database services for the reference module 310, i.e., provide location of information among the peers 110$a$ . . . 110$n$. The directory 320 may be implemented as a database, a file, etc., within the trusted-third-party 130. Alternatively, a lightweight directory access protocol server (LDAP, not shown) may be configured to provide the database services for the reference module 310.

The peer privacy module 330 may receive a request for information from a peer such as one of the peers 110$a$ . . . 110$n$. If the peer privacy module 330 determines that a peer contains the requested information, the peer privacy module 330 may be configured to determine an anonymous path between a data requester peer and a data provider peer. More specifically, the peer privacy module 330 may be configured to select a list of peers at random with the data requestor peer and the data provider peer as the respective ends of the list. The peer privacy module 330 may build an anonymizing path (mix) with the data provider peer as the first mix router and the data requestor peer as the last mix router with the data requestor peer as the first peer in the mix.

The peer privacy module 330 may then create an encryption key from the encryption module 340, where the generated encryption key may be used to encrypt a reference to the requested information. The encryption key is encrypted with a public key of the data requester peer and encrypted with the public key of the data provider peer. The encrypted data reference, the mix, the encryption key encrypted by the public key of the data provider peer, and the encryption key encrypted by the public key of the data requester peer may be transmitted as a message to the data provider peer through the network interface 360.

The peer privacy module 330 may be implemented as a software program, a utility, a subroutine, or other similar programming entity. In this respect, the peer privacy module 330 may be implemented using software languages such as C, C++, JAVA, etc. Alternatively, the peer privacy module 330 may be implemented as an electronic device utilizing an application specific integrated circuit, discrete components, solid-state components or combination thereof.

The encryption module 340 may be configured to provide encryption and decryption services to the peer privacy module 330. For example, the encryption module 340 may generate encryption keys, decrypt encrypted information, etc.

The encryption module 340 may use asymmetric, symmetric encryption algorithms or combination thereof.

The peer privacy module 330 may be further configured to interface with the operating system 350. More specifically, the peer privacy module 330 may be interfaced with the operating system 350 through an application program interface (API, not shown). The operating system 350 may be configured to manage the software applications, data and respective hardware components (e.g., displays, disk drives, etc.) of a peer. The MICROSOFT WINDOWS family of operating systems, UNIX, HEWLETT-PACKARD HP-UX, LINUX, RIM OS, and other similar operating systems may implement the operating system 350. Alternatively, the reference module 310 may be interfaced with the operating system 350 through the peer privacy module 330 or directly interfaced with the operating system 350.

The operating system 350 may be further configured to be coupled with the network interface 360 through a device driver (not shown). The network interface 360 may be configured to provide a communication port for the peer over the network 120 (shown in FIG. 1). The network interface 360 may be implemented using a network interface card, a wireless interface card or other similar input/output device.

Figure 4A:
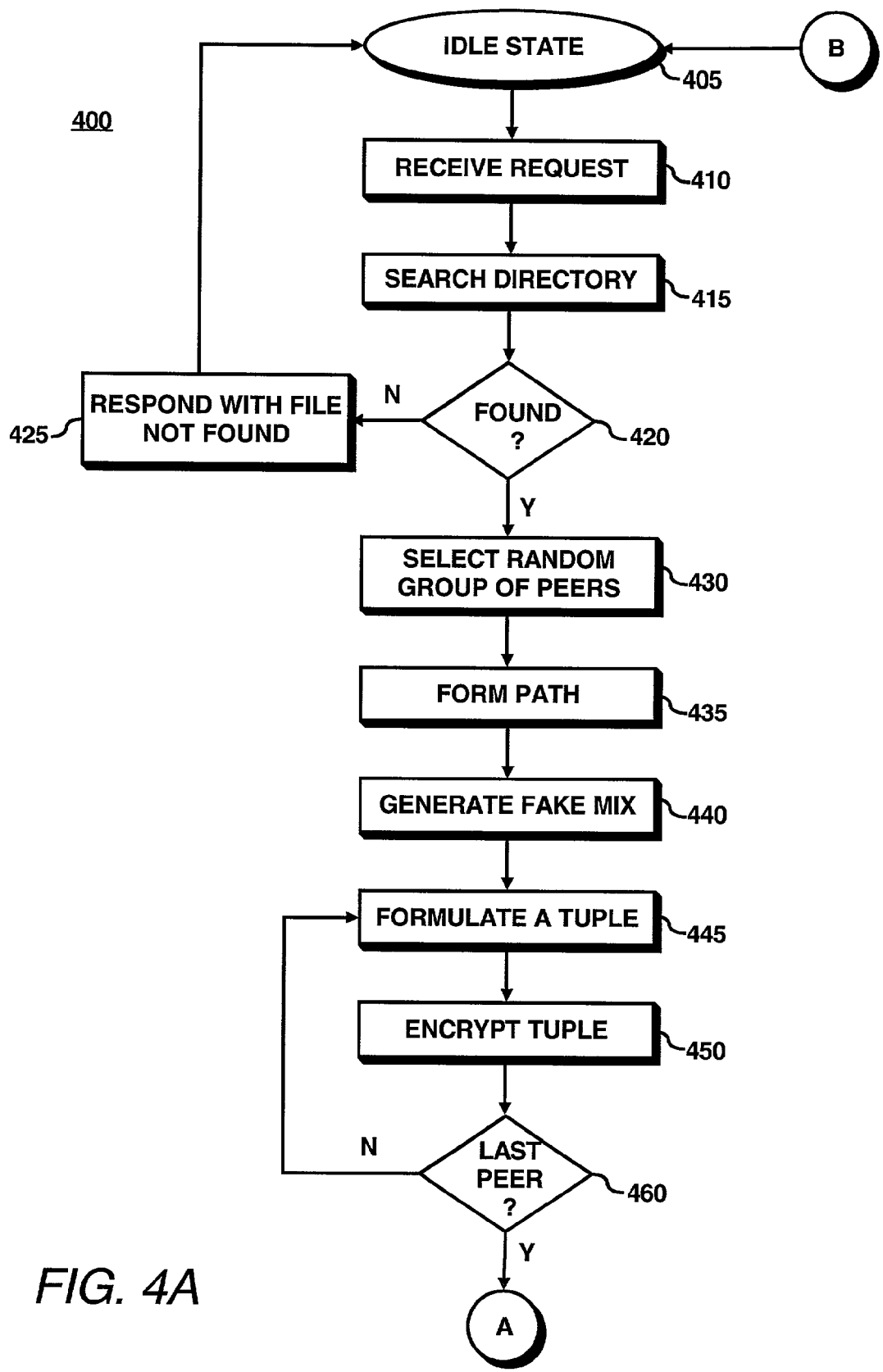
FIGS. 4A-B collectively illustrate an exemplary flow diagram according to an embodiment of the invention.
Figure 4B:
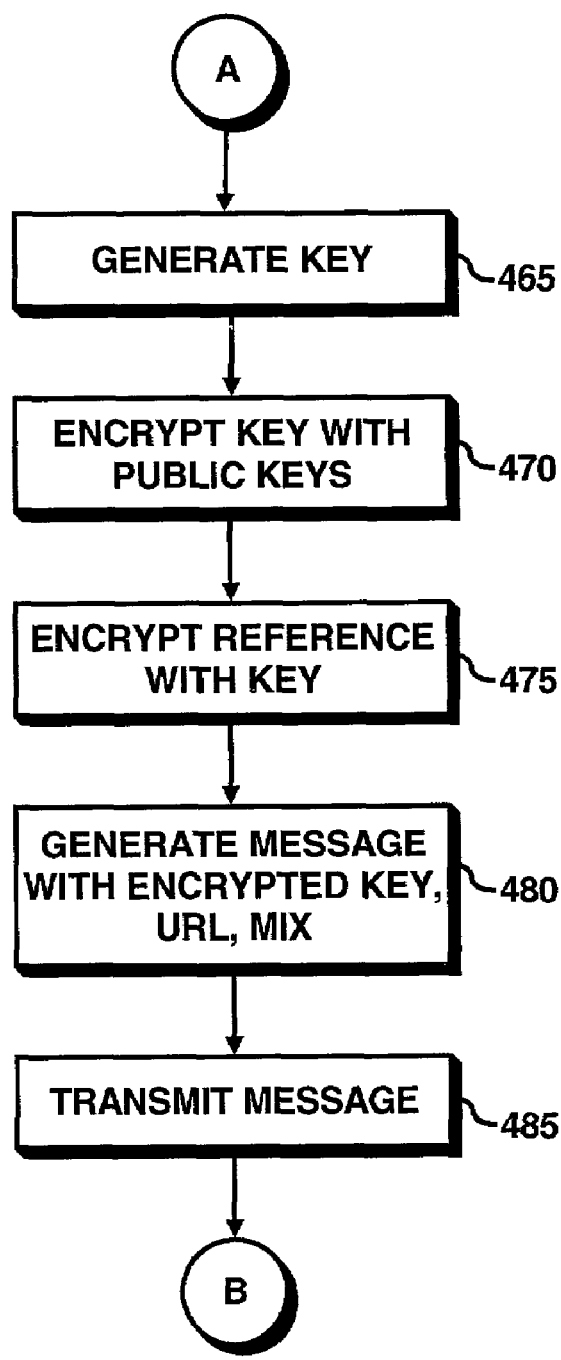

FIGS. 4A-B collectively illustrate an exemplary flow diagram for an operational mode 400 of the peer privacy module 330 shown in FIG. 3 in accordance with an embodiment of the present invention. It should be readily apparent to those of ordinary skill in the art that the first operational mode 400 of the peer privacy module represents a generalized schematic illustration and that other steps may be added or existing steps may be removed or modified without departing from the spirit or scope of the present invention.

As shown in FIG. 4A, in step 405, the peer privacy module 330 of the trusted-third-party 130 may be configured to be in an idle state. The peer privacy module 330 may receive a request for information (e.g., data, a file, etc.) from a data requestor peer through the network interface 360, in step 410. The request may be in a format of a packet or message transmitted using the appropriate network protocol of the network 120.

In step 415, the peer privacy module 330 may be configured to search the directory 320 for the requested information. The peer privacy module 330 may use the name of the requested information as an index into the directory 320 to search for the peer(s) storing the requested information. Other techniques for querying information may be implemented and within the scope of the present invention.

If the peer privacy module 330 determines that the requested information is not available on a peer in the system 100 (shown in FIG. 1), in step 420, the peer privacy module 330 may be configured to transmit a message to the data requester peer that the requested information is not available, in step 425. Subsequently, the peer privacy module 330 may be configured to return to an idle state of step 425.

Otherwise, returning to step 420, if the peer privacy module 330 determines that the requested information is available on a peer, the peer privacy module 330 may be configured to select a random group of peers from the peers 110a ... 110n, in step 430. The selected group of peers is to provide an anonymous path from the data provider peer to the data requester peer. The number peers in the selected group of peers may vary from instance to instance.

In step 435, once the selected group of peers is formed, the peer privacy module 330 may be configured to form a path through the selected group of peers, where the data requestor peer and the data provider peer are the respective ends of the path with the selected group of peers forming the intermediate segments of the path.

In step 440, the peer privacy module 330 may be configured to generate a fake mix (or decoy mix) for the anonymizing path (or mix) from the formed path in step 435. Subsequently, in step 445, the peer privacy module 330 may be configured to form a tuple comprising the decoy mix and the identity of the data requestor peer. The peer privacy module 330 encrypts the tuple with the public encryption key of the first peer next to the data provider peer according to the path to form a current state of the mix (or encrypted segment), in step 450.

The peer privacy module 330 may be configured to determine if the last peer on the path has been reached, in step 460. If the last peer has not been reached, the peer privacy module 330 may be also configured to form the next state of the mix by forming a second tuple with the current state of the mix and the identity of the first peer next to the data requester peer according to the path (step 445). Then, the peer privacy module 330 encrypts the second tuple with the public encryption key of the second peer along the path to form the next state of the mix (step 450).

More generally, the peer privacy module 330 may form a current tuple with a current peer and a current state of the mix (step 445). Subsequently, the peer privacy module 330 may be configured to encrypt the current tuple with the public key of the peer subsequent to the current peer according to the list to form a next state of the mix, i.e., an encrypted segment (step 450). The process of building of the mix continues until the data providing peer, i.e., the last peer, is reached according to the list. The mix may be represented by equation (1) where the random list of peers is represented by $<b_0, b_1, \ldots b_k>$ with $c_1$ and $c_2$ representing the end of the path:

$$\mathrm{mix} = \mathrm{public}_{c_1}(b_0, \mathrm{public}_{b_0}(\ldots (\mathrm{public}_{b_k}(c_2, \mathrm{fakemix})\ldots))) \quad (1)$$

where, the item 'fakemix' is introduced to confuse $b_k$ (a last middleman, i.e., the last peer according the list) such that it cannot be sure that $c_2$ is the data requester peer.

Returning to step 460, if the last peer has been reached, the peer privacy module 330 may be configured to generate an encryption key by using the encryption module 340, in step 465 with reference to FIG. 4B. The encryption module 340 may use an algorithm such as DES encryption algorithm, El Gamal encryption or other similar encryption algorithms.

In step 470, the peer privacy module 330 may be configured to encrypt the encryption key with a public key of the data requestor peer and with the public key of the data provider peer to form two encrypted versions of the same encryption key.

In step 475, the peer privacy module 330 may be configured to apply the encryption key to a reference to the requested information in the data provider peer by utilizing the encryption module 330. The reference may be a universal resource identifier (URI) such as a uniform resource locator.

In step 480, the peer privacy module 330 may be configured to form a message comprising of the encryption key encrypted with the public key of the data requestor peer, the encryption key encrypted with the public key of the data provider peer, the encrypted reference, and the current state of the mix. As an example, the contents of the message may be depicted by equation 2:

$$\{\mathrm{public}_{c_1}(D), D(\mathrm{URL}), \mathrm{mix}, \mathrm{public}_{c_2}(D)\} \quad (2)$$

where $c_1$ represents the provider peer and $c_2$ represent the data requester peer.

In step 485, the peer privacy module 330 may be configured to transmit the generated message to the data provider peer over the network interface 360. Subsequently, the peer privacy module 330 may also be configured to return to the idle state of step 405 as shown in FIG. 4A.

Figure 5:
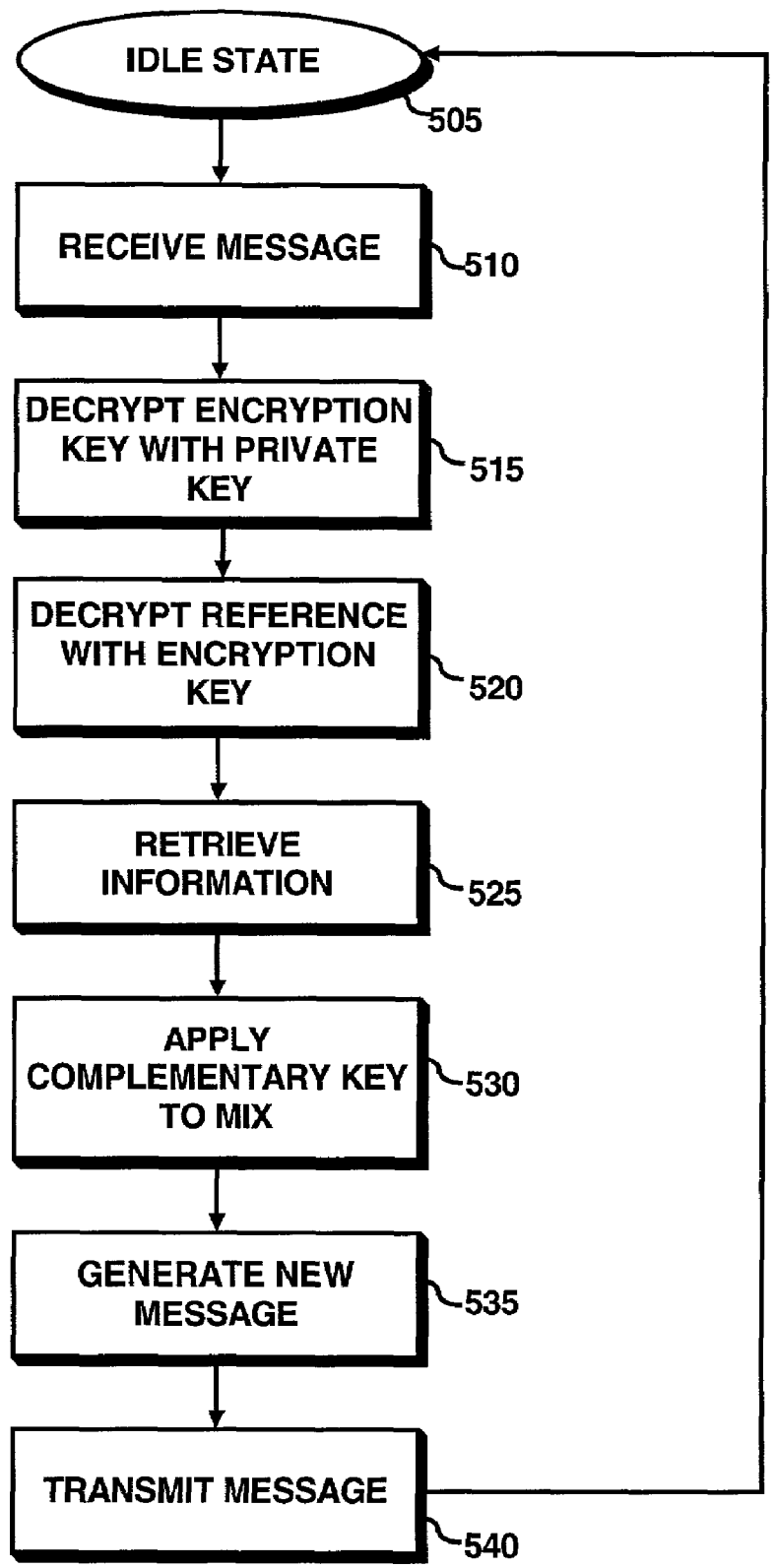
FIG. 5 illustrates an exemplary flow diagram according to another embodiment of the invention.

FIG. 5 illustrates an exemplary flow diagram for another operational mode 500 of the peer privacy module 220 shown in FIG. 2 in accordance with another embodiment of the present invention. It should be readily apparent to those of ordinary skill in the art that this operational mode of the peer privacy module 220 represents a generalized schematic illustration and that other steps may be added or existing steps may be removed or modified without departing from the spirit or scope of the present invention.

As shown in FIG. 5, the peer privacy module 220 may be configured to be in an idle state in step 505. The peer privacy module 220 may monitor the network interface 250 via the operating system 240 (shown in FIG. 2) for any received messages.

In step 510, the peer privacy module 220 may detect a message received through the network interface 250. The peer privacy module 220 may be configured to temporarily store the message for processing.

In step 515, the peer privacy module 220 may be configured to decrypt the encryption key encrypted with the public key of the data provider peer with a complementary key (or private key) to the public key by utilizing the encryption module 230. The public key and the complementary key may be a public/private key pair generated using asymmetric or symmetric encryption algorithms.

In step 520, the peer privacy module 220 may be configured to apply the encryption key to the encrypted reference from the message to obtain the reference to the requested data. Subsequently, in step 525, the peer privacy module 220 may also be configured to retrieve the requested information (e.g., data, file, etc.) from a data storage device accessible by the peer.

In step 530, the peer privacy module 220 may apply a complementary key (private key) to the current state of the mix to obtain the identity of the next peer and the previous state of the mix. The peer privacy module 220 temporarily stores the previous state of the mix.

In step 535, the peer privacy module 220 may be configured to generate a new message to be transmitted to the next peer identified by applying the complementary key. The message comprises the previous state of the mix, the encryption key encrypted with the public key of the data requester peer, and the encrypted information.

In step 540, the peer privacy module 220 may be configured to transmit the generated message through the network interface 220. Subsequently, the peer privacy module 220 may return to the idle state of step 505.

Figure 6:
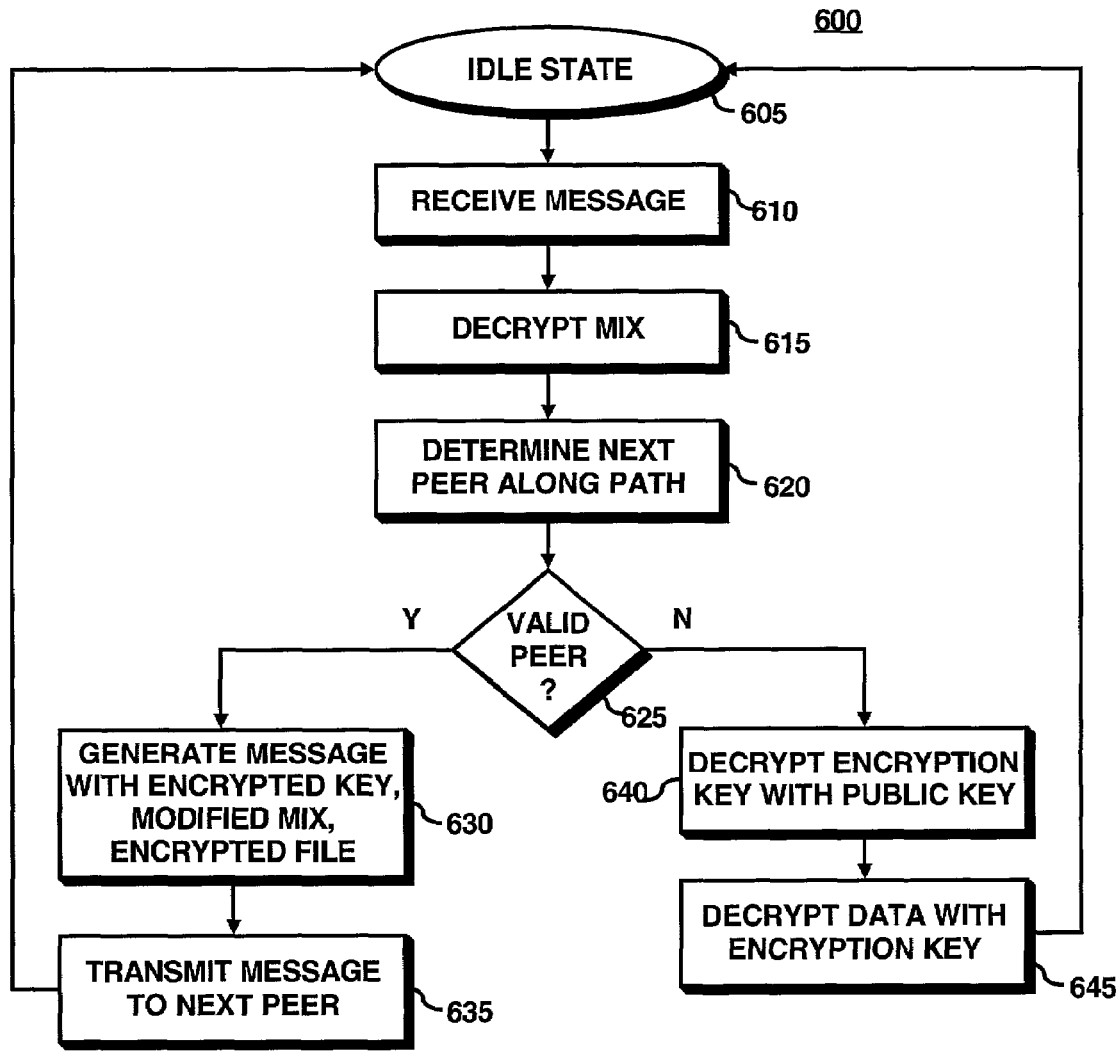
FIG. 6 illustrates an exemplary flow diagram according to yet another embodiment of the invention.

FIG. 6 illustrates an exemplary flow diagram for yet another operational mode 600 for the peer privacy module 220 shown in FIG. 2 in accordance with yet another embodiment of the present invention. It should be readily apparent to those of ordinary skill in the art that this operational mode of the peer privacy module 220 represents a generalized schematic illustration and that other steps may be added or existing steps may be removed or modified without departing from the spirit or scope of the present invention.

As shown in FIG. 6, the peer privacy module 220 may be configured to be in an idle state in step 605. The peer privacy module 220 may monitor the network interface 250 via the operating system 240 (shown in FIG. 2) for any received messages.

In step 610, the peer privacy module 220 may detect a message received through the network interface 250. The peer privacy module 220 may be configured to temporarily store the message for processing. The message may include the encryption key encrypted with the public key of the data requestor peer, the encrypted information, and the current state of the mix.

In step 615, the peer privacy module 220 may be configured to extract the mix from the received message. The peer privacy module 220 may then apply its complementary key to the mix by utilizing the encryption module 230 to obtain the identity of the next peer and a previous state of the mix.

In step 620, if the peer privacy module 220 determines that the retrieved identity from the mix is a valid peer, the peer privacy module 330 may be configured to generate a new message in step 625. The message may include the previous state of the mix, the encryption key encrypted with the public key of the data requester peer, and the encrypted file.

In step 630, the peer privacy module 220 may be configured to transmit the message to the identified peer from the mix. Subsequently, the peer privacy module 220 may return to the idle state of step 605, in step 635.

Returning to step 620, if the peer privacy module 220 determines that the retrieved peer from the current state of the mix is an invalid peer, the peer privacy module 220 may ascertain that the peer receiving the message is the data requestor peer. Accordingly, the peer privacy module 220 may extract the encrypted file from the message and apply the complementary key to the encrypted information by utilizing the encryption module 230 to obtain the information, in step 635. Subsequently, the peer privacy module 220 may return to the idle state of step 605.

Figure 7:
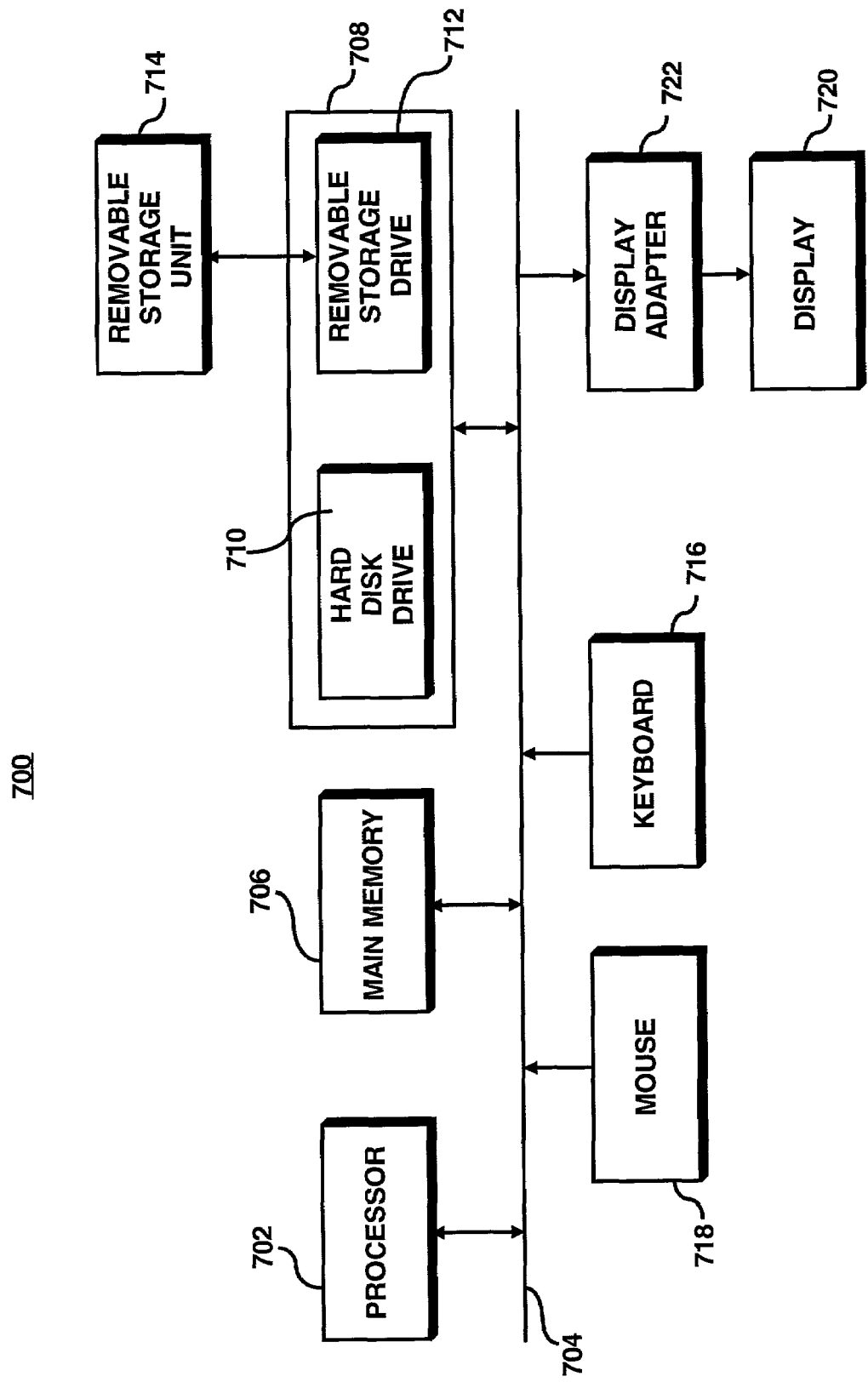
FIG. 7 illustrates an exemplary computer system where an embodiment of the present invention may be practiced.

FIG. 7 illustrates an exemplary block diagram of a computer system 700 where an embodiment of the present invention may be practiced. The functions of the peer privacy module 130 may be implemented in program code and executed by the computer system 700. The peer privacy module may be implemented in computer languages such as PASCAL, C, C++, JAVA, etc.

As shown in FIG. 7, the computer system 700 includes one or more processors, such as processor 702, that provide an execution platform for embodiments of the peer privacy module. Commands and data from the processor 702 are communicated over a communication bus 704. The computer system 700 also includes a main memory 706, such as a Random Access Memory (RAM), where the software for the peer privacy module may be executed during runtime, and a secondary memory 708. The secondary memory 708 includes, for example, a hard disk drive 710 and/or a removable storage drive 712, representing a floppy diskette drive, a magnetic tape drive, a compact disk drive, etc., where a copy of a computer program embodiment for the peer privacy module may be stored. The removable storage drive 712 reads from and/or writes to a removable storage unit 714 in a well-known manner. A user interfaces with the peer privacy module with a keyboard 716, a mouse 718, and a display 720. The display adaptor 722 interfaces with the communication bus 704 and the display 720 and receives display data from the processor 702 and converts the display data into display commands for the display 720.

Certain embodiments of the present invention may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments of the invention without departing from the true spirit and scope of the invention. The terms and descriptions used herein are set forth by way of illustration only and are not meant as limitations. In particular, although the method of the present invention has been described by examples, the steps of the method may be performed in a different order than illustrated or simultaneously. Those skilled in the art will recognize that these and other variations are possible within the spirit and scope of the invention as defined in the following claims and their equivalents.

What is claimed is:

1. A method of increasing peer privacy in a computer network including peers operable to exchange information via the network, wherein the peers include computing platforms, the method comprising:
   receiving a request for data from a data requestor;
   determining whether a data provider exists that stores the requested data; wherein the data provider is a peer of the peers;
   selecting a plurality of the peers to form a path between said data provider and said data requestor, wherein said data provider and said data requestor are the respective ends of said path;
   generating a mix according to said path, wherein the mix includes an anonymous identity of each of the plurality of peers in the path; and
   transmitting said mix to said data provider.

2. The method according to claim 1, further comprising:
   generating a first encryption key; and
   encrypting said first encryption key with a public encryption key of said data provider.

3. The method according to claim 2, further comprising:
   encrypting said reference to said data with said first encryption key; and
   encrypting said first encryption key with a public encryption key of said data requestor.

4. The method according to claim 3, further comprising:
   transmitting said encrypted first encryption key with said public key of said data provider, said encrypted reference to said data, said mix, said first encryption key with said public encryption key of said data requestor to said data provider as a message to said data provider.

5. The method according to claim 4, further comprising:
   receiving said message at said data provider;
   decrypting said first encryption key with a complementary encryption key to said public key of said data provider; and
   decrypting said data reference with said first encryption key.

6. The method according to claim 5, further comprising:
   modifying said mix with said complementary encryption key to obtain a subsequent peer to said data provider along said path;
   retrieving said data according to said data reference;
   encrypting said data with said first encryption key; and
   transmitting said modified mix to said subsequent peer along with encrypted data and said first encryption key with said public encryption key of said data requestor as a modified message.

7. The method according to claim 5, further comprising:
   receiving said modified message at a current peer along said path;
   modifying said mix with a complementary encryption key of said current peer to obtain a next peer along said path; and
   transmitting said modified mix along with said encrypted data and said first encryption key of said data requestor as another modified message to said next peer.

8. The method according to claim 1, wherein said generation of said mix further comprises:
   generating a decoy mix.

9. The method according to claim 8, further comprising:
   forming a tuple comprising said data requestor and said decoy mix; and
   modifying said mix by encrypting said tuple with an encryption key of a peer subsequent to said data provider in said path.

10. The method according to claim 9, wherein said encryption key comprises an public encryption key.

11. The method according to claim 10, wherein said public encryption key is generated by one of an asymmetric encryption algorithm.

12. The method according to claim 1, wherein said generation of said mix further comprises:
    selecting a current peer along said path;
    forming a current tuple comprising said current peer and a previous mix; and
    modifying said mix at said current peer by encrypting said current tuple with an encryption key of a subsequent peer to said current peer in said path.

13. The method according to claim 12, further comprising:
    repeating said formation and modification until said current peer being said data provider.

14. A method of increasing peer privacy in a computer network including peers operable to exchange information via the network, wherein the peers include computing platforms, the method comprising:
    receiving a message comprising a mix at a current peer, wherein the mix includes an anonymous identity of each of a plurality of peers in a path between a data provider and a data requestor in the network;
    modifring said mix by applying a complementary encryption key of said current peer to said mix;
    retrieving a subsequent peer to said current peer;
    modifying said message with said modified mix; and
    transmitting said modified message to said subsequent peer.

15. The method according to claim 14, further comprising:
    selecting a plurality of peers to form said path; and
    generating said mix according to said path.

16. The method according to claim 14, further comprising:
    adding encrypted requested data to said message from the data provider.

17. The method according to claim 14, further comprising:
generating a decoy mix, wherein said mix includes said decoy mix.

18. A system for increasing privacy in a computer network including peers operable to exchange information via the network, wherein the peers include computing platforms, the system comprising:
at least one processor;
memory coupled to said at least one processor; and
a privacy module residing in said memory and said privacy module executed by said at least one processor, wherein said privacy module is configured to:
receive a request for a data from a data requestor;
determine whether a data provider exists that stores the requested data; wherein the data provider is a peer of the peers;
select a plurality of the peers to form a path between said data provider and said data requestor, wherein said data provider and said data requestor are the respective ends of said path;
generate a mix according to said path, wherein the mix includes an anonymous identity of each of the plurality of peers in the path; and
transmit said mix to said data provider.

19. The system according to claim 18, wherein said privacy module is also configured to generate a first encryption key and to encrypt said first encryption key with a public encryption key of said data provider.

20. The system according to claim 19, wherein said privacy module is further configured to encrypt said reference to said data with said first encryption key and to encrypt said first encryption key with a public encryption key of said data requestor.

21. The system according to claim 20, wherein said privacy module is further configured to transmit said encrypted first encryption key with said public key of said data provider, said encrypted reference to said data, said mix, said first encryption key with said public encryption key of said data requestor to said data provider as a message to said data provider.

22. An apparatus for increasing privacy in a computer network including peers operable to exchange information via the network, wherein the peers include computing platforms, the apparatus comprising:
at least one processor;
memory coupled to said at least one processor; and
privacy module residing in said memory and said privacy module executed by said at least one processor, wherein said privacy module is configured to receive a message at said data provider, said message comprises:
a mix configured to provide a path among a plurality of the peers between a data provider and a data requestor in the network, wherein the mix includes an anonymous identity of each of the plurality of peers in the path;
an encrypted reference to requested data encrypted with a first encryption key;
an encrypted first encryption key protected with a public key of said data requestor; and
said privacy module is also configured to decrypt said first encryption key with a complementary encryption key to said public key of said data provider and to decrypt said data reference with said first encryption key.

23. The system according to claim 22, wherein said privacy module is further configured to:
modify said mix with said complementary encryption key to obtain a subsequent peer to said data provider along said path;
retrieve said data according to said data reference,
encrypt said data with said first encryption key; and
transmit said modified mix to said subsequent peer along with encrypted data and said first encryption key with said public encryption key of said data requestor as a modified message.

24. A computer readable storage device on which is embedded one or more computer programs, said one or more computer programs implementing a method of increasing peer privacy in a computer network including peers operable to exchange information via the network, wherein the peers include computing platforms, said one or more computer programs comprising a set of instructions for:
receiving a request for data from a data requestor;
determining whether a data provider exists that stores the requested data; wherein the data provider is a peer of the peers;
selecting a plurality of the peers to form a path between said data provider and said data requestor, wherein said data provider and said data requestor are the respective ends of said path;
generating a mix according to said path, wherein the mix includes an anonymous identity of each of the plurality of peers in the path; and
transmitting said mix to said data provider.

25. The computer readable storage device in according to claim 24, said one or more computer programs further comprising a set of instructions for:
generating a first encryption key; and
encrypting said first encryption key with a public encryption key of said data provider.

26. The computer readable storage device in according to claim 25, said one or more computer programs further comprising a set of instructions for:
encrypting said reference to said data with said first encryption key; and
encrypting said first encryption key with a public encryption key of said data requestor.

27. The computer readable storage device in according to claim 26, said one or more computer programs further comprising a set of instructions for:
transmitting said encrypted first encryption key with said public key of said data provider, said encrypted reference to said data, said mix, said first encryption key with said public encryption key of said data requestor to said data provider as a message to said data provider.

28. The computer readable storage device in according to claim 27, said one or more computer programs further comprising a set of instructions for:
receiving said message at said data provider;
decrypting said first encryption key with a complementary encryption key to said public key of said data provider; and
decrypting said data reference with said first encryption key.

29. The computer readable storage device in according to claim 28, said one or more computer programs further comprising a set of instructions for:
modifying said mix with said complementary encryption key to obtain a subsequent peer to said data provider along said path;
retrieving said data according to said data reference;
encrypting said data with said first encryption key; and
transmitting said modified mix to said subsequent peer along with encrypted data and said first encryption key with said public encryption key of said data requestor as a modified message.

30. The computer readable storage device in according to claim 29, said one or more computer programs further comprising a set of instructions for:

receiving said modified message at a current peer along said path;

modifying said mix with a complementary encryption key of said current peer to obtain a next peer along said path; and transmitting said modified mix along with said encrypted data and said first encryption key of said data requestor as another modified message to said next peer.

31. The computer readable storage device in according to claim 24, said one or more computer programs further comprising a set of instructions for:

generating a decoy mix.

32. The computer readable storage device in according to claim 31, said one or more computer programs further comprising a set of instructions for:

forming a tuple comprising said data requestor and said decoy mix; and modifying said mix by encrypting said tuple with an encryption key of a peer subsequent to said data requestor in said path.

33. The computer readable storage device in according to claim 32, said one or more computer programs further, wherein said encryption key comprises an public encryption key.

34. The computer readable storage device in according to claim 33, said one or more computer programs further, wherein said public encryption key is generated by one of a symmetric encryption algorithm and an asymmetric encryption algorithm.

35. The computer readable storage device in according to claim 24, said one or more computer programs further, wherein said generation of said mix further comprises:

selecting a current peer along said path;

forming a current tuple comprising said current peer and a previous mix; and modifying said mix at said current peer by encrypting said current tuple with an encryption key of a subsequent peer to said current peer in said path.

36. The computer readable storage device in according to claim 35, said one or more computer programs further comprising a set of instructions for:

repeating said formation and modification until said current peer being said data provider.

* * * * *

UNITED STATES PATENT AND TRADEMARK OFFICE
CERTIFICATE OF CORRECTION

PATENT NO. : 7,398,388 B2
APPLICATION NO. : 10/084436
DATED : July 8, 2008
INVENTOR(S) : Zhichen Xu et al.

It is certified that error appears in the above-identified patent and that said Letters Patent is hereby corrected as shown below:

In column 14, line 56, in Claim 14, delete "modifring" and insert -- modifying --, therefor.

In column 15, line 13, in Claim 18, delete "requestor," and insert -- requestor; --, therefor.

In column 15, line 46, in Claim 22, insert -- a -- before "privacy module".

Signed and Sealed this

Sixth Day of January, 2009

JON W. DUDAS
*Director of the United States Patent and Trademark Office*